US012750762B2

(12) United States Patent
Peng

(10) Patent No.: US 12,750,762 B2
(45) Date of Patent: Sep. 29, 2026

(54) LINK STATE SWITCHING METHOD AND COMMUNICATIONS DEVICE

(71) Applicant: VIVO MOBILE COMMUNICATION CO., LTD., Chang'an Dongguan (CN)

(72) Inventor: Shuyan Peng, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 579 days.

(21) Appl. No.: 17/966,007

(22) Filed: Oct. 14, 2022

(65) Prior Publication Data

US 2023/0044271 A1 Feb. 9, 2023

Related U.S. Application Data

(63) Continuation of application No. PCT/CN2021/089885, filed on Apr. 26, 2021.

(30) Foreign Application Priority Data

Apr. 30, 2020 (CN) ......................... 202010367097.5

(51) Int. Cl.
*H04W 40/22* (2009.01)
*H04W 56/00* (2009.01)

(52) U.S. Cl.
CPC ......... *H04W 40/22* (2013.01); *H04W 56/001* (2013.01)

(58) Field of Classification Search
CPC ............................ H04W 40/22; H04W 56/001
See application file for complete search history.

(56) References Cited

U.S. PATENT DOCUMENTS

| | | | | |
|---|---|---|---|---|
| 2012/0134316 | A1 | 5/2012 | Seo et al. | |
| 2019/0260537 | A1 | 8/2019 | Seo et al. | |
| 2020/0059879 | A1 | 2/2020 | Nam et al. | |
| 2021/0195541 | A1* | 6/2021 | Wei | H04B 7/15557 |
| 2021/0212070 | A1* | 7/2021 | Luo | H04L 27/2605 |
| 2021/0235345 | A1* | 7/2021 | Luo | H04W 36/0011 |
| 2023/0036240 | A1* | 2/2023 | You | H04L 27/2602 |
| 2023/0065102 | A1* | 3/2023 | You | H04W 56/00 |
| 2025/0031254 | A1* | 1/2025 | Maya | H04W 72/51 |

FOREIGN PATENT DOCUMENTS

| | | | |
|---|---|---|---|
| CN | 102318229 | A | 1/2012 |
| CN | 106411384 | A | 2/2017 |
| KR | 20200017860 | A | 2/2020 |

(Continued)

OTHER PUBLICATIONS

EP Search Report dated Aug. 2, 2023 in application No. 21796143.2.

(Continued)

*Primary Examiner* — Kevin T Bates
*Assistant Examiner* — Jaeyoung Kwak
(74) *Attorney, Agent, or Firm* — Perilla Knox & Hildebrandt; Kenneth A. Knox

(57) ABSTRACT

This application provides a link state switching method and a communications device. The method includes: switching between a first link state and a second link state based on a first guard period, where the first link state and the second link state are link states of an integrated access backhaul IAB node in different transmission modes.

15 Claims, 6 Drawing Sheets

(56) References Cited

FOREIGN PATENT DOCUMENTS

| | | |
|---|---|---|
| WO | 2020/036961 A1 | 2/2020 |
| WO | 2020/056648 A1 | 3/2020 |

OTHER PUBLICATIONS

Huawei, HiSilicon, "Physical layer design for NR IAB", 3GPP TSG RAN WG1 Meeting #94bis, R1-1810130, Oct. 8-12, 2018.

LG Electronics, "Remaining details on IAB resource multiplexing", 3GPP TSG RAN WG1 #100bis e-Meeting, R1-2001952, Apr. 20-30, 2020.

Intel Corporation., "Overview on RAN1 related issues in IAB," 3GPP TSG RAN WG1 #92bis, R1-1804755, pp. 1-15, (Apr. 20, 2018).

Huawei et al., "Resource multiplexing between backhaul and access in Iab," 3GPP TSG RAN WG1 Meeting #98bis, R1-1910051, pp. 1-8, (Oct. 20, 2019).

International Search Report and Written Opinion of the International Searching Authority dated Jul. 27, 2021 as received in Application No. PCT/CN2021/089885.

CN Office Action dated Dec. 27, 2022 as received in Application No. 202010367097.5.

IN Patent Examination Report dated Mar. 6, 2023 as received in Application No. 202227068727.

First Office Action for KR Patent Application No. 10-2022-7041658 of Oct. 20, 2025.

* cited by examiner

LINK STATE SWITCHING METHOD AND COMMUNICATIONS DEVICE

CROSS-REFERENCE TO RELATED APPLICATIONS

This application is a continuation application of International Application No. PCT/CN2021/089885 filed on Apr. 26, 2021, which claims priority to Chinese Patent Application No. 202010367097.5, filed in China on Apr. 30, 2020, which is incorporated herein by reference in its entirety.

TECHNICAL FIELD

This application relates to the field of wireless communications technologies, and in particular, to a link state switching method and a communications device.

BACKGROUND

In a wireless communications system, to increase network capacity and coverage and satisfy the need for cell deployment flexibility, an integrated access backhaul (IAB) technology is proposed. An IAB node includes a distributed unit (DU) and a mobile termination (MT), where the DU of the IAB node provides service for terminals (UE) accessing the IAB node, and the MT is able to establish a wireless backhaul link with a DU of a previous-hop IAB node (for example, an IAB parent node or a donor IAB node, that is, donor IAB). In addition, the IAB node may have the following four link states: DU transmission (TX), MT transmission, DU reception (RX), and MT reception. Switching between link states is supported. However, intersymbol overlap is likely to occur on the IAB node during a switching between link states, causing interference to data transmission, which degrades reliability of data transmission.

SUMMARY

According to a first aspect, an embodiment of this application provides a link state switching method, applied to a first relay device. The method includes:

switching between a first link state and a second link state based on a first guard period, where the first link state and the second link state are link states of an IAB node in different transmission modes.

According to a second aspect, an embodiment of this application further provides a link state switching apparatus, applied to a first relay device. The apparatus includes:

a switching module, configured to switch between a first link state and a second link state based on a first guard period, where the first link state and the second link state are link states of an IAB node in different transmission modes.

According to a third aspect, an embodiment of this application further provides a relay device, where the relay device includes a memory, a processor, and a computer program stored in the memory and capable of running on the processor, where when the computer program is executed by the processor, the steps of the link state switching method according to the first aspect are implemented.

According to a fourth aspect, an embodiment of this application further provides a computer-readable storage medium, where the computer-readable storage medium stores a computer program, and when the computer program is executed by a processor, the steps of the link state switching method according to the first aspect are implemented.

According to a fifth aspect, an embodiment of this application provides a chip. The chip includes a processor and a communications interface, where the communications interface is coupled to the processor, and the processor is configured to run programs or instructions to implement the steps of the link state switching method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the term "include" and any other variants thereof are intended to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates the following three cases: only A presents, only B presents, or both A and B present.

In the embodiments of this application, the word such as "an example" or "for example" is used to represent giving an example, an instance, or an illustration. Any embodiment or design solution described as "an example" or "for example" in the embodiments of this application shall not be interpreted to be more preferential or advantageous than other embodiments or design solutions. Specifically, the word such as "an example" or "for example" is intended to present a related concept in a specific manner.

The following specifically describes the link state switching method provided in the embodiments of this application through specific embodiments and application scenarios thereof with reference to the accompanying drawings.

Figure 1:
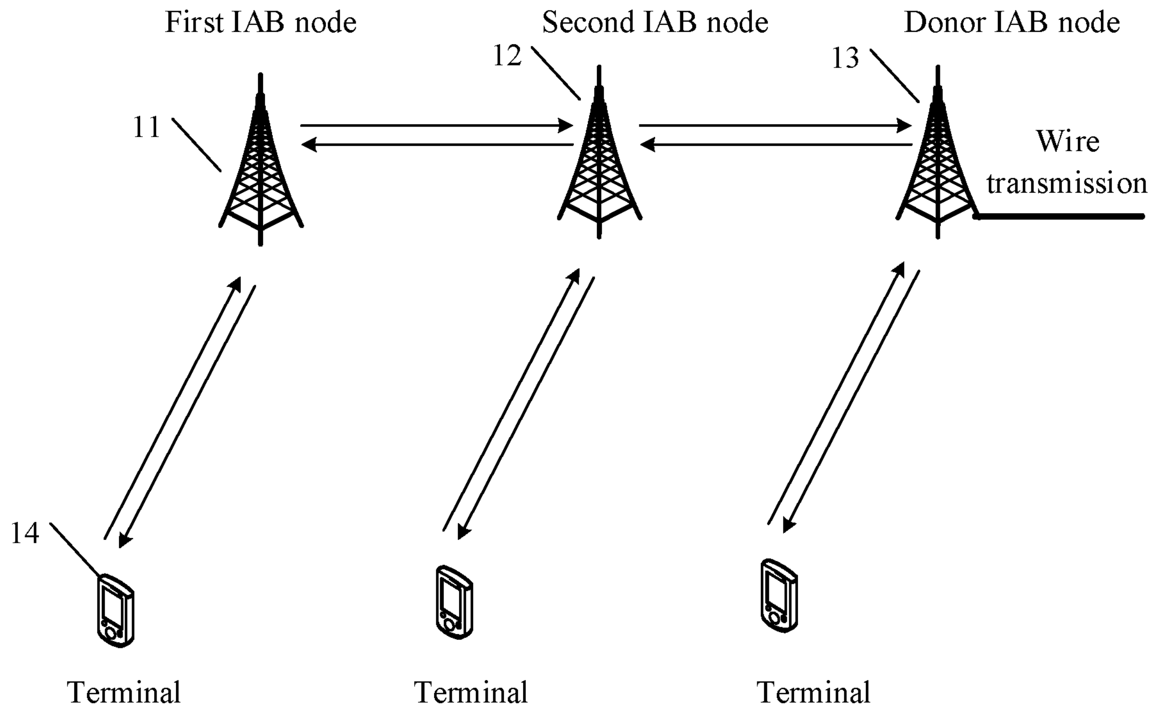
FIG. 1 is a schematic structural diagram of an IAB system according to an embodiment of this application.

FIG. 1 is a schematic structural diagram of an integrated access backhaul (IAB) system according to an embodiment of this application. As shown in FIG. 1, the IAB system includes at least two IAB nodes (such as a first IAB node 11 and a second IAB node 12), a donor IAB node 13, and terminals (User Equipment, UE) 14, where each IAB node includes a distributed unit (DU) and a mobile termination (MT), the DU of the IAB node provides access service for the terminals 14 accessing the IAB node, the MT is able to establish a wireless backhaul link with a DU of a previous-hop IAB node, that is, an IAB parent node (for example, the second IAB node 12 is an IAB parent node of the first IAB node 11, the donor IAB node 13 is an IAB parent node of the second IAB node 12, and the donor IAB node 13 is a network-side device including a CU and the like), so as to perform data transmission; and the donor IAB node 13 is provided with a DU, with a backhaul link being wire transmission. Certainly, FIG. 1 shows only a case in which the IAB node includes the first IAB node 11 and the second IAB node 12. An actual IAB system may include more IAB nodes or only one IAB node (that is, there is only one IAB node, and one network device corresponding to the IAB node is a parent node of the IAB node). This is not limited herein.

Figure 2:
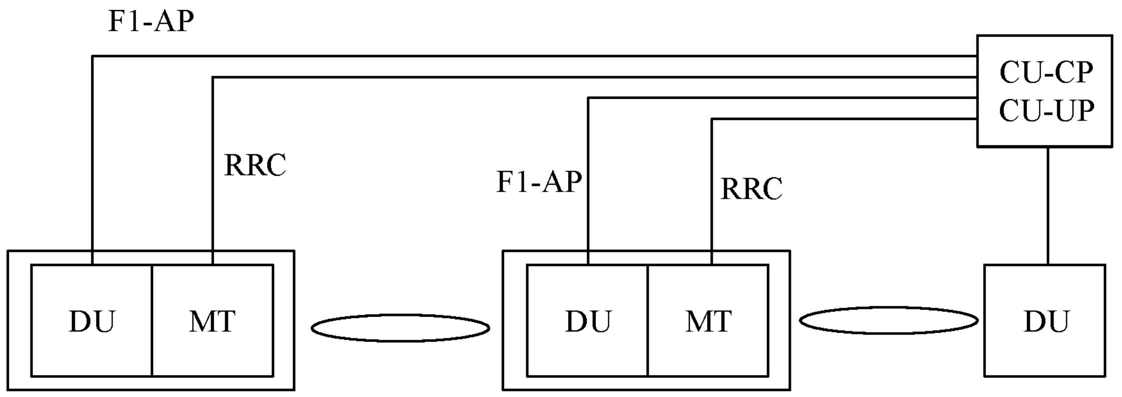
FIG. 2 is a schematic structural diagram of CU-DU of the IAB system according to an embodiment of this application.

In addition, FIG. 2 is a schematic structural diagram of Centralized Unit-Distributed Unit (CU-DU) according to an embodiment of this application. As shown in FIG. 2, in an IAB system, DUs of all IAB nodes are connected to a CU node, and the CU node is able to configure the DUs through an F1 application (F1-AP) protocol, and the CU is able to configure an MT through a radio resource control (RRC) protocol. Alternatively, a DU of a parent node of an IAB node is able to configure an MT of the IAB node through RRC. Introduction of an IAB system into wireless communication (for example, 5G NR) can resolve a problem that a wire transmission network is not deployed in place when access points are intensively deployed. To be specific, in the absence of the wire transmission network, the access points can implement data transmission through wireless backhaul to transmit backhaul information of the IAB node.

Figure 3:
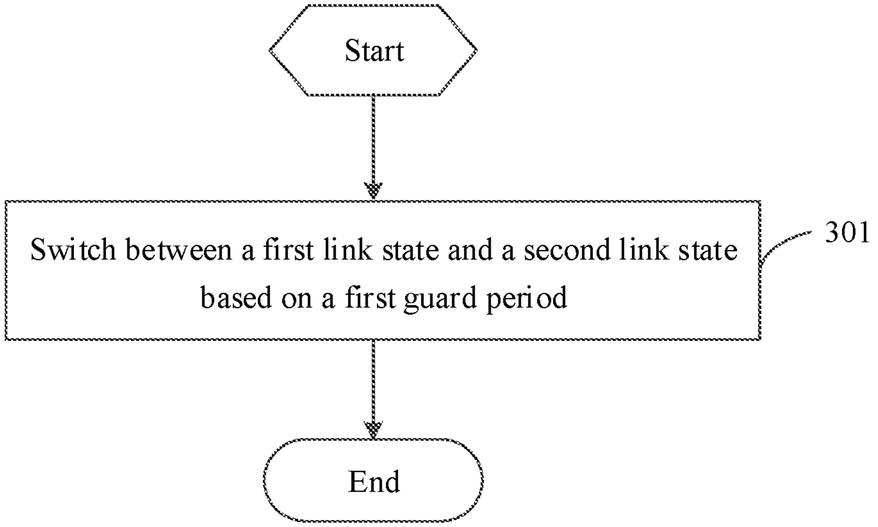
FIG. 3 is a schematic flowchart of a link state switching method according to an embodiment of this application.

Referring to FIG. 3, FIG. 3 is a schematic flowchart of a link state switching method according to an embodiment of this application. The link state switching method is applied to a first relay device. As shown in FIG. 3, the link state switching method includes the following step.

Step 301: Switch between a first link state and a second link state based on a first guard period, where the first link state and the second link state are link states of an IAB node in different transmission modes.

Herein, the first guard period is defined by a protocol or configured by first signaling, so that based on the first guard period, the IAB node is able to switch between the first link state and the second link state corresponding to the IAB node in different transmission modes, which can avoid interference caused by inter-symbol overlap occurring on the IAB node during a switching between link states in different transmission modes, thereby improving reliability of data transmission.

In this application, the IAB node includes an MT and a DU, and both the MT and the DU can perform TX or reception RX of data. In a case that half duplex is supported between the MT and the DU of the IAB node, link states of the IAB node for performing data transmission may include MT TX, MT RX, DU TX, and DU RX. In a case that full duplex is supported between the MT and the DU of the IAB node or a case that only reception is supported between the MT and the DU of the IAB node, data reception or transmission of the MT and data reception of the DU can be performed synchronously. In a case that full duplex is supported between the MT and the DU of the IAB node or a case that only transmission is supported between the MT and the DU of the IAB node, data reception or transmission of the MT and data transmission of the DU can be performed synchronously; or in a case that full duplex is supported between the MT and the DU of the IAB node, transmission and reception can be performed synchronously. Therefore, the link states of the IAB node for performing data transmission may further include the following manners:

DU TX and MT TX work synchronously (DU TX and MT TX for short), that is, DU and MT transmit data synchronously;

DU RX and MT RX work synchronously (DU RX and MT RX for short), that is, DU and MT receive data synchronously;

DU RX and MT TX work synchronously (DU RX and MT TX for short), that is, data reception of DU and data transmission of MT are performed synchronously; and DU TX and MT RX work synchronously (DU TX and MT RX for short), that is, data transmission of DU and data reception of MT are performed synchronously.

In some cases, the data transmission of MT and the data reception of DU may be referred to as uplink (UL), and the data reception of MT and the data transmission of DU may be referred to as data downlink (DL). Therefore, in cases described in this application that MT TX is replaced by MT UL, MT RX is replaced by MT DL, DU TX is replaced by DU DL, and DU RX is replaced by DU UL, the link state switching method of this application can also be implemented.

In addition, the transmission modes may be transmission modes for defining synchronization of various IAB nodes in study for performing timing synchronization on the IAB nodes based on synchronization rules, for example, seven cases (which are corresponding to seven transmission modes or seven timing modes) for synchronization of the IAB nodes are defined in a study stage of R16. The transmission modes in this application include but are not limited to transmission modes corresponding to the seven cases defined by R16. Cases 1, 6, and 7 are specifically described herein below.

In case 1 (that is, case 1), DU TX of an IAB node is aligned with TX timing of an IAB parent node in time domain units (in this case, the IAB parent node may be a base station) or DU TX is aligned with DU TX timing of an IAB parent node in time domain units (in this case, the IAB parent node may be an IAB node), where the IAB parent node is a parent node of the IAB node.

In case 6 (that is, case 6), MT TX and DU TX of an IAB node are aligned in time domain units or MT TX and DU TX work synchronously (that is, MT and DU transmit data synchronously); and DU TX of an IAB node is aligned with TX timing of an IAB parent node in time domain units or DU TX of an IAB node is aligned with DU TX timing of an IAB parent node in time domain units.

In case 7 (that is, case 7), MT RX and DU RX of an IAB node are aligned in time domain units or MT RX and DU RX work synchronously; and DU RX of an IAB node is aligned with RX timing of an IAB parent node in time domain units or DU RX of an IAB node is aligned with DU RX timing of an IAB parent node in time domain units, or the like.

The time domain unit may be any one of a symbol, a symbol set, a slo, a subframe, a frame, a microsecond, a millisecond, a second, and the like. It should be noted that in various cases for synchronization of the IAB nodes, various time domain units may be different or the same. For example, in case 6, MT TX and DU TX may be aligned in symbols (that are time domain units in which MT TX and DU TX are aligned), and DU TX is aligned with TX timing of the IAB parent node in slots (that are time domain units in which DU TX is aligned with TX timing of the IAB parent node); or MT TX and DU TX may also be aligned in symbols, and DU TX may also be aligned with TX timing of the IAB parent node in symbols.

Figure 4:
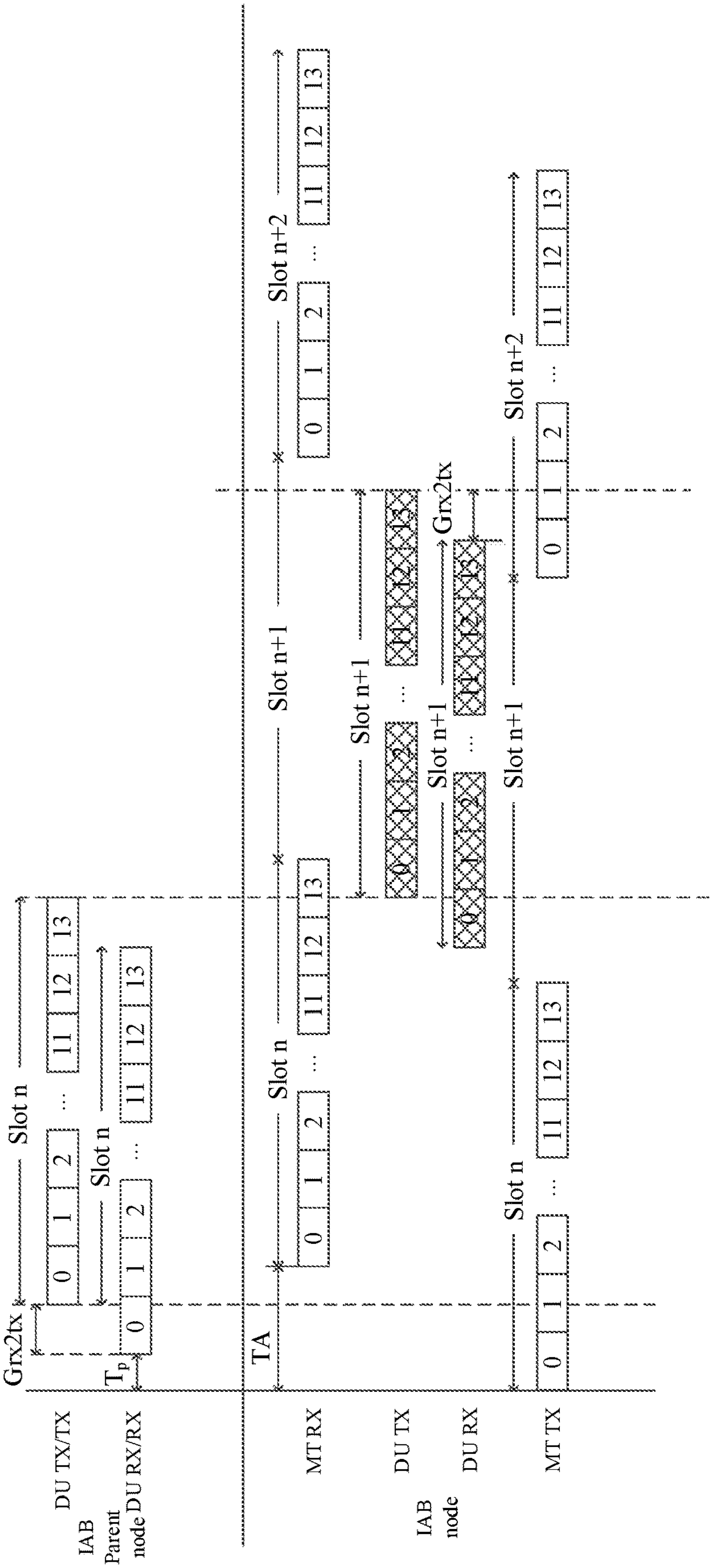
FIG. 4 is a first schematic diagram of a principle of link state switching of an IAB node according to an embodiment of this application.

In addition, in the study for performing timing synchronization based on the synchronization rules, TA can be obtained according to the synchronization rules, and timing of the IAB node is adjusted according to TA. For example, in case 1 shown in FIG. 4, the IAB parent node (which may be a donor IAB node or a previous-hop IAB node) notifies the IAB node of a time difference T_delta between DU RX/RX and DU TX/TX (which may also be considered as a time difference between UL and DL) and applies the time difference to DU TX of the IAB node, and DU TX of the IAB node adjusts timing of the IAB node according to a MT RX reception time, where a timing advance referred to as TA of DU TX compared to MT RX can be obtained by calculating through a formula (1) as follows:

$$TA=(N_{TA}+N_{TA\_offset})\times Tc/2+T\_\text{delta} \quad (1)$$

where $N_{TA}$ offset is a parameter indicated by radio resource control (RRC) or a value configured by default;

$T_c$ is a minimum time unit; and $N_{TA}$ can be obtained through two manners as follows.

Manner 1: A random access response (RAR) carries 12 bits information, indicating that TA=0, 1, 2, . . . , 3846; and $N_{TA}$=TA×16×64/$2^u$ is obtained based on an indication value, where u represents an SCS parameter.

Manner 2: A medium access control control element (MAC CE) carries 6 bits indication information, indicating that TA=0, 1, 2, . . . , 63; $N_{TA\_new}=N_{TA\_old}+(T_A-31)\times16\times64/2^u$ is obtained based on an indication value, where $N_{TA\_old}$ is a previous TA value; and a new TA value is obtained by adjusting according to an indication of MAC CE.

In this application, the first link state may be a link state in any one of various defined transmission modes. In one embodiment, the first link state may be a link state in a first transmission mode, and the first transmission mode satisfies: MT TX and DU TX are aligned in time domain units or MT TX and DU TX work synchronously; and DU TX is aligned with TX timing of an IAB parent node in time domain units or DU TX is aligned with DU TX timing of the IAB parent node in time domain units, where the IAB parent node is a parent node of the IAB node, that is, the first transmission mode is a transmission mode of case 6.

The second link state may also be a link state in any one of various defined transmission modes, and a transmission mode of the second link state is different from that of the first link state. In one embodiment, the second link state is a link state in a second transmission mode, and the second transmission mode satisfies: DU TX is aligned with TX timing of an IAB parent node in time domain units or DU TX is aligned with DU TX timing of the IAB parent node in time domain units, where the IAB parent node is a parent node of the IAB node, that is, the second transmission mode is a transmission mode of case 1.

In addition, the first link state and the second link state are link states in two different transmission modes; the first link state and the second link state may be at least one of MT TX, MT RX, DU TX, and DU RX; and the first link state and the second link state may be the same or different link states.

For example, the first link state is MT TX in the first transmission mode, and the second link state is MT TX in the second transmission mode, that is, the first link state and the second link state are the same in link states but different in transmission modes; or the first link state is DU TX in the first transmission mode, and the second link state is MT TX in the second transmission mode, that is, the first link state and the second link state are different in link states and transmission modes.

In this application, the switching between the first link state and the second link state may be switching from the first link state to the second link state or may be switching from the second link state to the first link state.

The first guard period may include one or more guard periods, and each guard period corresponds to one link switching case. However, in a case that there are a plurality of guard periods, different guard periods of the first guard period are for: switching between different first link states and the second link state and/or switching between the first link state and different second link states. It should be understood that the different guard periods may be different types of guard periods and are not limited to guard periods with different durations, and durations of the plurality of guard periods may be the same or different. This is not limited herein.

In one embodiment, the switching between the first link state and the second link state may be switching between link states in the first transmission mode and the second transmission mode, including any one of the following implementations.

Implementation 1: switching from the first link state to the second link state in a case that the first link state is at least one of MT TX and DU TX and the second link state is MT TX.

Implementation 2: switching from the second link state to the first link state in a case that the first link state is at least one of MT TX and DU TX and the second link state is MT TX.

Implementation 3: switching from the first link state to the second link state in a case that the first link state is at least one of MT TX and DU TX and the second link state is MT RX.

Implementation 4: switching from the second link state to the first link state in a case that the first link state is at least one of MT TX and DU TX and the second link state is MT RX.

Implementation 5: switching from the first link state to the second link state in a case that the first link state is at least one of MT TX and DU TX and the second link state is DU TX.

Implementation 6: switching from the second link state to the first link state in a case that the first link state is at least one of MT TX and DU TX and the second link state is DU TX.

Implementation 7: switching from the first link state to the second link state in a case that the first link state is at least one of MT TX and DU TX and the second link state is DU RX.

Implementation 8: switching from the second link state to the first link state in a case that the first link state is at least one of MT TX and DU TX and the second link state is DU RX.

Figure 5:
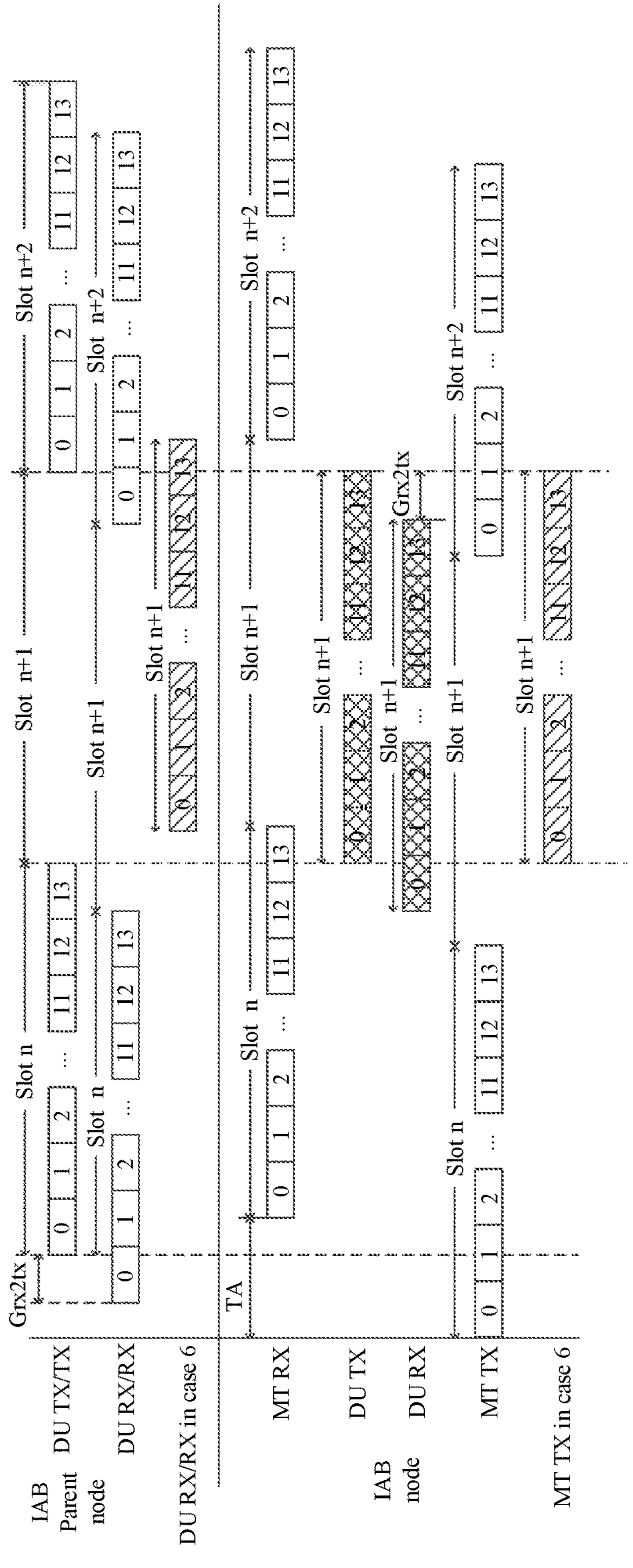
FIG. 5 is a second schematic diagram of the principle of link state switching of the IAB node according to the embodiment of this application.

For example, as shown in FIG. 5, the IAB node performs data transmission at a slot n by using MT RX of case 1 and performs data transmission synchronously at a Slot n+1 by using MT TX and DU TX of case 6. In this case, the IAB node transmits switching between link states from the (Slot) n to the Slot n+1, that is, the second link state of MT RX is switched to the first link state of MT TX and DU TX.

In this application, the switching between the first link state and the second link state based on the first guard period can be understood as that the IAB node does not perform data transmission in the first guard period in a case that the IAB node switches between the first link state and the second link state. It should be noted that a time unit of the first guard period may be a symbol, a slot, a subframe, a half-frame, a frame, a microsecond, a millisecond, a second, and the like.

The first guard period is a provided guard symbol parameter (Guard-Symbols Provided) and is used to indicate the number of unusable symbols (or referred to as the number of guard symbols) for the IAB node, that is, data transmission is not performed in the number of unusable symbols indicated by the first guard period (which may be the number of unusable symbols for the IAB node in some link states).

In addition, the first guard period may include one or more guard periods, and each guard period may apply to switching between link states corresponding to the guard period. In one embodiment, in a case that the switching between the link states in the first transmission mode and the second transmission mode includes Implementations 1 to 8, the first guard period may include at least one of the following:

- a guard period for switching from a first link state of MT TX and/or DU TX to a second link state of MT TX, which is a guard period corresponding to Implementation 1;
- a guard period for switching from a first link state of MT TX and/or DU TX to a second link state of MT RX, which is a guard period corresponding to Implementation 3;
- a guard period for switching from a second link state of MT TX to a first link state of MT TX and/or DU TX, which is a guard period corresponding to Implementation 2;
- a guard period for switching from a second link state of MT RX to a first link state of MT TX and/or DU TX, which is a guard period corresponding to Implementation 4;
- a guard period for switching from a first link state of MT TX and/or DU TX to a second link state of DU TX, which is a guard period corresponding to Implementation 5;
- a guard period for switching from a first link state of MT TX and/or DU TX to a second link state of DU RX, which is a guard period corresponding to Implementation 7;
- a guard period for switching from a second link state of DU TX to a first link state of MT TX and/or DU TX, which is a guard period corresponding to Implementation 6; and
- a guard period for switching from a second link state of DU RX to a first link state of MT TX and/or DU TX, which is a guard period corresponding to Implementation 8.

The guard periods corresponding to the Implementations 1 to 8 may be the same or different values predefined according to actual situations. In one embodiment, the guard periods may include at least one of the following:

- a guard period for switching from a second link state of MT TX to a first link state of MT TX and/or DU TX being 0;
- a guard period for switching from a first link state of MT TX and/or DU TX to a second link state of DU TX being 0; and
- a guard period for switching from a second link state of DU TX to a first link state of MT TX and/or DU TX being 0.

In some implementations, the first guard period is defined by a protocol or configured by first signaling.

In addition, the first relay device may be an IAB node, or the first relay device may also be a CU or an IAB parent node. This is not limited herein.

In one embodiment, the first signaling may include at least one of the following:

- signaling with which the IAB node reports first information to a centralized unit CU or an IAB parent node; or
- signaling with which the CU or the IAB parent node configures first information for the IAB node, where
- the first information includes the first guard period or information associated with the first guard period.

For example, in a process of configuring a first guard period for an IAB node through signaling, the IAB node may obtain guard periods corresponding to switching of at least one link state (that is, associate such link state with the first guard period) and transmits the obtained guard period to a CU or an IAB parent node through signaling (that is, signaling with which the IAB node reports the guard period to the centralized unit CU or the IAB parent node). In response to the received signaling, the CU or the IAB parent node also obtains guard periods (which may be the same as or different from a link state obtained by the IAB node) corresponding to switching of at least one link state (that is, a first guard period) and transmits the obtained guard period to the IAB node through signaling (that is, signaling with which the CU or the IAB parent node configures a guard period for the IAB node), so as to configure the first guard period for the IAB node by the CU or the IAB parent node.

It should be noted that the first guard period may be a specific value predefined by a protocol or configured by signaling. For example, for switching between MT TX or MT RX and DU TX or DU RX, 8 guard periods (that are G1 to G8) shown in Table 1 below may be defined by a protocol, and a value of each guard period may be 0-4 symbols. Certainly, values of the guard periods may also be greater than 4. This is not limited herein.

TABLE 1

| Guard periods defined by protocol | | |
|---|---|---|
| MT to DU | DU TX | DU RX |
| MT RX | $G_1$ | $G_2$ |
| MT TX | $G_3$ | $G_4$ |
| DU to MT | MT RX | MT TX |
| DU TX | $G_5$ | $G_6$ |
| DU RX | $G_7$ | $G_8$ |

Alternatively, the values of the guard periods may also be values defined by a protocol or indicated by signaling according to preset rules. In one embodiment, the first guard period is associated with a second guard period. The second guard period is a guard period set for switching between the second link state and a third link state. The third link state and the second link state are link states under a same transmission mode. Herein, the second guard period may be defined by a protocol or configured by signaling.

The first guard period being associated with the second guard period may be defined by a protocol or configured by signaling; and the first guard period being associated with the second guard period can be understood as that part or all guard periods in the first guard period are the same as part or all guard periods in the second guard period.

For example, provided that a first guard period includes a guard period 1 and a guard period 2 for switching from a link state (that is, a first link state) in case 6 to a link state (that is, a second link state) in case 1, a second guard period includes a guard period 3 for switching two link states in case 1 (that is, the third link state and the second link state are link states in case 1), where the guard period 1 or 2 being equal to the guard period 3 may be defined by a protocol or configured by signaling.

It should be noted that in a case that part of guard periods in the first guard period are the same as guard periods in the second guard periods, other guard periods in the first guard period may be specific values defined by a protocol or configured by signaling. This is not limited herein.

In addition, the guard periods in the first guard period being equal to the guard periods in the second guard period may be defined by a protocol or configured by signaling according to actual needs. In one embodiment, in some implementations, the first guard period being associated with the second guard period may include at least one of the following:

- a guard period for switching from a first link state of MT TX and/or DU TX to a second link state of MT TX in the first guard period is equal to a guard period for switching from a second link state of DU TX to a third link state of MT TX in the second guard period, for example, a guard period for switching from MT TX in case 6 to MT TX in case 1 is equal to a guard period for switching from DU TX in case 1 to MT TX in case 1;
- a guard period for switching from a first link state of MT TX and/or DU TX to a second link state of MT RX in the first guard period is equal to a guard period for switching from a second link state of DU TX to a third link state of MT RX in the second guard period, for example, a guard period for switching from MT TX in case 6 to MT RX in case 1 is equal to a guard period for switching from DU TX in case 1 to MT RX in case 1;
- a guard period for switching from a second link state of MT RX to a first link state of MT TX and/or DU TX in the first guard period is equal to a guard period for switching from a second link state of MT RX to a third link state of DU TX in the second guard period, for example, a guard period for switching from MT RX in case 1 to MT TX in case 6 is equal to a guard period for switching from MT RX in case 1 to DU TX in case 1;
- a guard period for switching from a second link state of MT TX to a first link state of MT TX and/or DU TX in the first guard period is equal to a guard period for switching from a second link state of MT TX to a third link state of DU TX in the second guard period, for example, a guard period for switching from MT TX in case 1 to MT TX in case 6 is equal to a guard period for switching from MT TX in case 1 to DU TX in case 1;
- a guard period for switching from a first link state of MT TX and/or DU TX to a second link state of DU TX in the first guard period is equal to a guard period for switching from a second link state of MT TX to a third link state of DU TX in the second guard period, for example, a guard period for switching from MT TX in case 6 to DU TX in case 1 is equal to a guard period for switching from MT TX in case 1 to DU TX in case 1;
- a guard period for switching from a first link state of MT TX and/or DU TX to a second link state of DU RX in the first guard period is equal to a guard period for switching from a second link state of MT TX to a third link state of DU RX in the second guard period, for example, a guard period for switching MT TX in case 6 to DU RX in case 1 is equal to a guard period for switching from MT TX in case 1 to DU RX in case 1;
- a guard period for switching from a second link state of DU RX to a first link state of MT TX and/or DU TX in the first guard period is equal to a guard period for switching from a second link state of DU RX to a third link state of MT TX in the second guard period, for example, a guard period for switching from DU RX in case 1 to MT TX in case 6 is equal to a guard period for switching from DU RX in case 1 to MT TX in case 1; and
- a guard period for switching from a second link state of DU TX to a first link state of MT TX and/or DU TX in the first guard period is equal to a guard period for switching from a second link state of DU TX to a third link state of MT TX in the second guard period, for example, a guard period for switching from DU TX in case 1 to MT TX in case 6 is equal to a guard period for switching from DU TX in case 1 to MT TX in case 1.

In this application, for switching between the first link state and the second link state based on the first guard period, an object to which the first guard period applies may be defined by a protocol or configured by a network device, a CU, or an IAB parent node, so that the object to which the first guard period applies does not perform data transmission in the first guard period.

The first guard period may apply to MT or DU of an IAB node. In one embodiment, the object to which the first guard period applies includes at least one of the following:

- MT in the first link state;
- MT in the second link state;
- DU in the first link state; and
- DU in the second link state.

For example, as shown in FIG. 5, in a case that the IAB node switches from a first link state of MT RX to a second link state of MT TX and DU TX, the object to which the first guard period applies may be at least one of MT in MT TX and DU in DU TX; or the object to which the first guard period applies may be MT in MT RX.

In one embodiment, in a case that the first guard period is for switching between a first link state of MT TX and/or DU TX and a second link state of MT TX or MT RX, the first guard period applies to MT or DU in the first link state.

For example, in the case as shown in FIG. 5, the object to which the first guard period applies may be at least one of MT in MT TX and DU in DU TX.

In one embodiment, the first guard period satisfies at least one of the following:

in a case that the first guard period is for switching between a first link state of MT TX and/or DU TX and a second link state of MT TX, the first guard period applies to MT in the second link state of MT TX;

in a case that the first guard period is for switching between a first link state of MT TX and/or DU TX and a second link state of MT RX, the first guard period applies to MT in the second link state of MT RX;

in a case that the first guard period is for switching between a first link state of MT TX and/or DU TX and a second link state of DU TX, the first guard period applies to MT and/or DU in the first link state of MT TX and/or DU TX, for example, in a case that the first guard period is for switching between a first link state of MT TX and a second link state of DU TX, the first guard period applies to MT in the first link state of MT TX; in a case that the first guard period is for switching between a first link state of DU TX and a second link state of DU TX, the first guard period applies to DU in the first link state of DU TX; in a case that the first guard period is for switching between a first link state of MT TX and DU TX and a second link state of DU TX, the first guard period applies to MT and DU in the first link state of MT TX and DU TX; and in a case that the first guard period is for switching between a first link state of MT TX and/or DU TX and a second link state of DU RX, the first guard period applies to MT and/or DU in the first link state of MT TX and/or DU TX.

It should be noted that the object to which the first guard period applies being configured by the network device, the CU, or the IAB parent node may be an object to which the first guard period applies being configured by first signaling or may be an object to which the first guard period applies being configured by another signaling. This is not limited herein.

In addition, the first guard period may also be defined by the protocol or configured by the network device, the CU or the IAB parent node to apply to a time period of the applied-to object. In one embodiment, the first guard period applies to a start time period or an end time period of a link state of the applied-to object.

It should be noted that the first guard period applying to the start time period or the end time period of the link state of the applied-to object may be defined or configured according to switching cases of different link states. In one embodiment, in a case that the first guard period is for switching from a first link state of MT TX and/or DU TX to a second link state of MT TX or MT RX, the first guard period applies to an end time period of the first link state of MT TX and/or DU TX; or in a case that the first guard period is for switching from a second link state of MT TX or MT RX to a first link state of MT TX and/or DU TX, the first guard period applies to a start time period of the first link state of MT TX and/or DU TX.

For example, as shown in FIG. 5, in a case that the IAB node switches from a first link state of MT RX to a second link state of MT TX and DU TX, if the object to which the first guard period applies is MT in MT TX and DU in DU TX and the first guard period includes a guard period 1 for switching from MT RX to MT TX and a guard period 2 for switching from MT RX to DU TX, MT does not transmit data in the guard period 1 of the start time period in symbols 0 to 13 and DU does not transmit data in the guard period 2 of the start time period in symbols 0 to 13 when the IAB node transmits data on Slot n+1. In one embodiment, if the guard period 1 is 2 symbols and the guard period 2 is 3 symbols, MT does not perform TX in symbols 0 and 1, and DU does not perform TX in symbols 0 to 2.

In this embodiment, the switching between the first link state and the second link state based on the first guard period may be performed by an IAB node including MT and DU or be performed by a donor IAB node including only DU. This is not limited herein.

In addition, the first guard period being defined by the protocol or configured by the signaling may be defined or configured only in a case that the first relay device supports both a transmission mode of a first link state and a transmission mode of a second link state. MT and DU can transmit or receive synchronously, or one of MT and DU transmits and the other receives, so that frequency division multiplexing (FDM) or spatial division multiplexing (SDM) can be performed between MT and DU, thereby reducing resource overheads.

In one embodiment, in a case that the first relay device is the IAB node, the method further includes:

transmitting second signaling to an IAB parent node or a CU, where the second signaling is used to indicate whether the IAB node supports a first transmission mode and a second transmission mode, or indicate configurations of the first transmission mode and the second transmission mode.

Herein, the IAB node can report, to the parent node or the CU, whether two transmission modes (that are the first transmission mode and the second transmission mode) or configurations of the two transmission modes are supported, so as to assist the parent node or the CU to configure the first guard period for the IAB node.

The second signaling may be any signaling that can be transmitted by the IAB node to the CU or the parent node. In one embodiment, the second signaling may include at least one of the following:

higher layer or physical layer signaling, radio resource control (RRC) signaling, MAC CE signaling, downlink control information (DCI) signaling, backhaul application protocol control protocol data unit (BAP control PDU), physical downlink control channel (PDCCH), and the like.

In some implementations, in a case that the first relay device is an IAB node, the IAB node can report at least one of a DU RX offset and a time at which the DU RX offset occurs. This can prevent the DU RX offset of the IAB node from occurring and causing interference on scheduling of the IAB parent node or the CU, thereby further improving stability of data transmission.

During data transmission, the IAB node can report the DU RX offset and the time at which the DU RX offset occurs that are configured for the IAB node to the parent node or the CU through signaling. The signaling with which the IAB node implements report may be at least one of high layer or physical layer signaling, RRC signaling, MAC CE signaling, DCI signaling, and BAP control PDU signaling, and the like. It should be noted that the signaling may be the same as or different from signaling with which the IAB node reports the first guard period or information associated with the first guard period to the IAB parent node or the CU.

In addition, the time at which the DU RX offset occurs may be a slot, a subslot, an uplink symbol (UL symbol), or the like at which the DU RX offset occurs.

It should be noted that for configuring a switching period between link states of the IAB node, an independent switching period is configured for switching between a link state corresponding to a time period with the DU RX offset and other link states, that is, the independent switching period is independent of a switching period for switching between a link state corresponding to a time period without the DU RX offset and other link states.

In some implementations, the IAB parent node is configured with a first offset associated with the first guard period.

Herein, the IAB parent node is configured with the first offset, so that the IAB parent node is able to configure the first offset for the IAB node, and therefore the IAB node is able to switch between the first link state and the second link state based on the first guard period and the first offset, for example, the IAB node is able to switch between the first link state and the second link state based on a sum of the first guard period and the first offset. This can prevent the DU RX offset of the IAB parent node from occurring and causing interference on scheduling of the IAB node, thereby further improving stability of data transmission.

The first offset associated with the first guard period is a guard period additionally set for switching at least one link state associated with the first guard period. In one embodiment, the first offset includes at least one of the following:

a guard period for switching from a first link state of MT TX and/or DU TX to a second link state of MT TX or MT RX, which is a guard period set for MT in the first link state; or a guard period for switching from a second link state of MT TX or MT RX to a first link state of MT TX and/or DU TX, which is a guard period set for MT in the first link state.

It should be noted that the first offset is a guard time set for MT in the first link state, and the first offset may be set in a position of MT in the first link state according to actual needs. In one embodiment, the first offset is set in an end time period of MT in the first link state.

In addition, that the IAB parent node configures the first offset associated with the first guard period for the IAB node can be implemented by the IAB node through the first signaling or another signaling, where the first signaling or the another signaling may also be at least one of high layer or physical layer signaling, RRC signaling, MAC CE signaling, DCI signaling, BAP control PDU signaling, PDCCH, and the like.

In this application, the first signaling may be configured with a first indication that is used to indicate whether data transmission is configured with the first guard period. Therefore, during data transmission, the first relay device can dynamically indicate whether a transmission has a guard period through the first indication.

In addition, in a case that the first indication is used to indicate that data transmission is configured with the first guard period, the first indication may be further used to indicate that the first guard period applies to a time period of data transmission.

In one embodiment, the first indication may be further used to indicate that the first guard period applies to a start time period or an end time period of data transmission.

In some implementations, in a cast that the first relay device is the IAB parent node or the CU, the method further includes: transmitting third signaling to a terminal, where the third signaling is used to configure a third guard period for MT TX and/or MT RX of the IAB node or uplink transmission and/or downlink transmission of the terminal, thereby further improving stability of data transmission.

The third signaling may be any signaling that can be transmitted by the IAB parent node or the CU to the terminal. In one embodiment, the third signaling may include at least one of the following: high layer or physical layer signaling, RRC signaling, MAC CE signaling, DCI signaling, BAP control PDU, PDCCH, and the like.

In addition, the third signaling may be further used for at least one of the following:

configuring a time unit of the third guard period, for example, a slot, a subslot, or a symbol;

configuring a duration of the third guard period; and configuring a start time period and/or an end time period of MT TX and/or MT RX of the IAB node to which the third guard period applies.

In this implementation, during data transmission, the third signaling may be further used to indicate data transmission to which the third guard period applies, that is, the third signaling may be further used to dynamically indicate whether the third guard period applies to a data transmission.

The third signaling being further used to indicate data transmission to which the third guard period applies may indicate whether data transmission has a guard period through a flag in DCI signaling in a case that the third signaling is DCI signaling.

Certainly, in a case that the third signaling is further used to indicate data transmission to which the third guard period applies, the third signaling can also configure or dynamically indicate a duration of the third guard period or configure or dynamically indicate that the third guard period applies to a start time period and/or an end time period of MT TX and/or MT RX of the IAB node.

In addition, the third guard period may be a guard period configured for at least one of uplink transmission and downlink transmission of a terminal. In one embodiment, the third guard period may be a guard period for puncturing or rate matching of uplink transmission and/or downlink transmission of the terminal.

Figure 6:
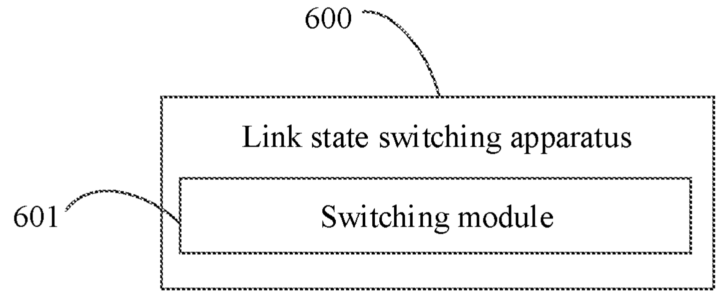
FIG. 6 is a first schematic structural diagram of a link state switching apparatus according to an embodiment of this application.

Referring to FIG. 6, FIG. 6 is a link state switching apparatus according to an embodiment of this application. The link state switching apparatus is applied to the first relay device. As shown in FIG. 6, the link state switching apparatus 600 includes:

a switching module 601, configured to switch between a first link state and a second link state based on a first guard period, where the first link state and the second link state are link states of an IAB node in different transmission modes.

Optionally, the first link state is a link state in a first transmission mode, and the first transmission mode satisfies:

mobile termination transmission MT TX and distributed unit transmission DU TX are aligned in time domain units or MT TX and DU TX work synchronously; and DU TX is aligned with TX timing of an IAB parent node in time domain units or DU TX is aligned with DU TX timing of the IAB parent node in time domain units, where the IAB parent node is a parent node of the IAB node.

Optionally, the second link state is a link state in a second transmission mode, and the second transmission mode satisfies:

DU TX is aligned with TX timing of an IAB parent node in time domain units or DU TX is aligned with DU TX timing of the IAB parent node in time domain units, where the IAB parent node is a parent node of the IAB node.

Optionally, different guard periods of the first guard period are for: switching between different first link states and the second link state and/or switching between the first link state and different second link states.

Optionally, the first guard period includes at least one of the following:

a guard period for switching from a first link state of MT TX and/or DU TX to a second link state of MT TX;

a guard period for switching from a first link state of MT TX and/or DU TX to a second link state of mobile termination reception MT RX;

a guard period for switching from a second link state of MT TX to a first link state of MT TX and/or DU TX;

a guard period for switching from a second link state of MT RX to a first link state of MT TX and/or DU TX;

a guard period for switching from a first link state of MT TX and/or DU TX to a second link state of DU TX;

a guard period for switching from a first link state of MT TX and/or DU TX to a second link state of distributed unit reception DU RX;

a guard period for switching from a second link state of DU TX to a first link state of MT TX and/or DU TX; and a guard period for switching from a second link state of DU RX to a first link state of MT TX and/or DU TX.

Optionally, the first guard period is defined by a protocol or configured by first signaling.

Optionally, the first signaling includes at least one of the following:

signaling with which the IAB node reports first information to a centralized unit CU or an IAB parent node; or signaling with which the CU or the IAB parent node configures first information for the IAB node, where the first information includes the first guard period or information associated with the first guard period.

Optionally, the first guard period is associated with a second guard period. The second guard period is a guard period for switching between the second link state and a third link state. The third link state and the second link state are link states under a same transmission mode.

Optionally, the first guard period being associated with the second guard period includes at least one of the following:

a guard period for switching from a first link state of MT TX and/or DU TX to a second link state of MT TX in the first guard period is equal to a guard period for switching from a second link state of DU TX to a third link state of MT TX in the second guard period;

a guard period for switching from a first link state of MT TX and/or DU TX to a second link state of MT RX in the first guard period is equal to a guard period for switching from a second link state of DU TX to a third link state of MT RX in the second guard period;

a guard period for switching from a second link state of MT RX to a first link state of MT TX and/or DU TX in the first guard period is equal to a guard period for switching from a second link state of MT RX to a third link state of DU TX in the second guard period;

a guard period for switching from a second link state of MT TX to a first link state of MT TX and/or DU TX in the first guard period is equal to a guard period for switching from a second link state of MT TX to a third link state of DU TX in the second guard period;

a guard period for switching from a first link state of MT TX and/or DU TX to a second link state of DU TX in the first guard period is equal to a guard period for switching from a second link state of MT TX to a third link state of DU TX in the second guard period;

a guard period for switching from a first link state of MT TX and/or DU TX to a second link state of DU RX in the first guard period is equal to a guard period for switching from a second link state of MT TX to a third link state of DU RX in the second guard period;

a guard period for switching from a second link state of DU RX to a first link state of MT TX and/or DU TX in the first guard period is equal to a guard period for switching from a second link state of DU RX to a third link state of MT TX in the second guard period; and a guard period for switching from a second link state of DU TX to a first link state of MT TX and/or DU TX in the first guard period is equal to a guard period for switching from a second link state of DU TX to a third link state of MT TX in the second guard period.

Optionally, an object to which the first guard period applies is defined by a protocol or configured by a network device, a CU, or an IAB parent node.

Optionally, the object to which the first guard period applies includes at least one of the following:

MT in the first link state;

MT in the second link state;

DU in the first link state; and

DU in the second link state.

Optionally, in a case that the first guard period is for switching between a first link state of MT TX and/or DU TX and a second link state of MT TX or MT RX, the first guard period applies to MT or DU in the first link state.

Optionally, the first guard period satisfies at least one of the following:

in a case that the first guard period is for switching between a first link state of MT TX and/or DU TX and a second link state of MT TX, the first guard period applies to MT in the second link state of MT TX;

in a case that the first guard period is for switching between a first link state of MT TX and/or DU TX and a second link state of MT RX, the first guard period applies to MT in the second link state of MT RX;

in a case that the first guard period is for switching between a first link state of MT TX and/or DU TX and a second link state of DU TX, the first guard period applies to MT and/or DU in the first link state of MT TX and/or DU TX; and in a case that the first guard period is for switching between a first link state of MT TX and/or DU TX and a second link state of DU RX, the first guard period applies to MT and/or DU in the first link state of MT TX and/or DU TX.

Optionally, the first guard period applies to a start time period or an end time period of a link state of the applied-to object.

Optionally, in a case that the first guard period is for switching from a first link state of MT TX and/or DU TX to a second link state of MT TX or MT RX, the first guard period applies to an end time period of the first link state of MT TX and/or DU TX; or in a case that the first guard period is for switching from a second link state of MT TX or MT RX to a first link state of MT TX and/or DU TX, the first guard period applies to a start time period of the first link state of MT TX and/or DU TX.

Figure 7:
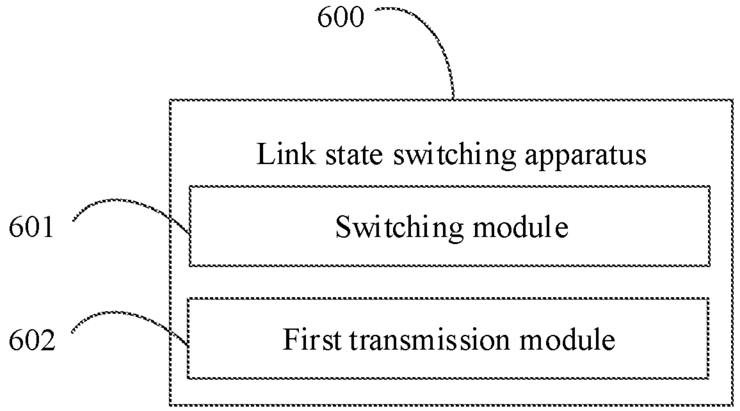
FIG. 7 is a second schematic structural diagram of the link state switching apparatus according to the embodiment of this application.

Optionally, in a case that the first relay device is the IAB node, as shown in FIG. 7, the apparatus 600 further includes:

a first transmission module 602, configured to transmit second signaling to the IAB parent node or a CU, where the second signaling is used to indicate whether the IAB node supports a first transmission mode and a second transmission mode, or indicate configurations of the first transmission mode and the second transmission mode.

Optionally, in a case that the first relay device is an IAB node, the IAB node reports a DU RX offset and/or a time at which the DU RX occurs.

Optionally, the IAB parent node is configured with a first offset associated with the first guard period.

Optionally, the first signaling is configured with a first indication that is used to indicate whether data transmission is configured with the first guard period.

Optionally, the first indication is further used to indicate that the first guard period applies to a start time period or an end time period of data transmission.

Figure 8:
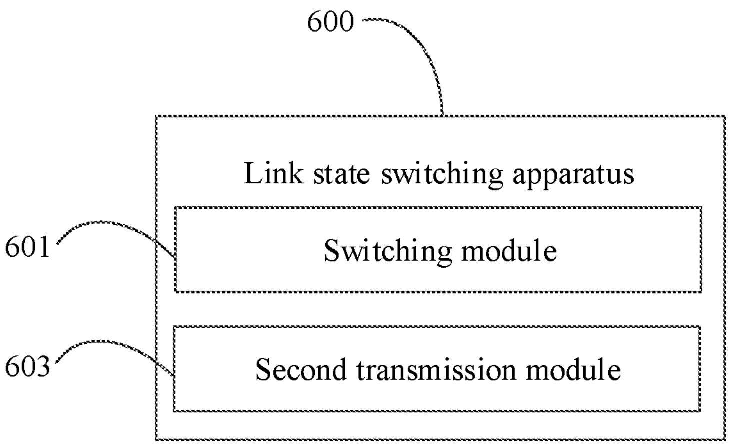
FIG. 8 is a third schematic structural diagram of the link state switching apparatus according to the embodiment of this application.

Optionally, in a case that the first relay device is the IAB parent node or the CU, as shown in FIG. 8, the apparatus 600 further includes:

a second transmission module 603, configured to transmit third signaling to a terminal, where the third signaling is used to configure a third guard period for MT TX and/or MT RX of the IAB node or uplink transmission and/or downlink transmission of the terminal.

Optionally, the third signaling is further used for at least one of the following:

configuring a time unit of the third guard period;

configuring a duration of the third guard period; and configuring a start time period and/or an end time period of MT TX and/or MT RX of the IAB node to which the third guard period applies.

Optionally, the third signaling includes at least one of the following:

higher layer or physical layer signaling, radio resource control RRC signaling, medium access control control element MAC CE signaling, downlink control information DCI signaling, backhaul application protocol control protocol data unit BAP control PDU, and physical downlink control channel PDCCH.

Optionally, the third guard period is a guard period for puncturing or rate matching of uplink transmission and/or downlink transmission of the terminal.

It should be noted that any implementation of the first relay device in the method embodiments shown in FIG. 3 in the embodiments of this application can be implemented by the link state switching apparatus 600 in the embodiments of this application, with the same beneficial effect achieved. To avoid repetition, details are not described herein again.

Figure 9:
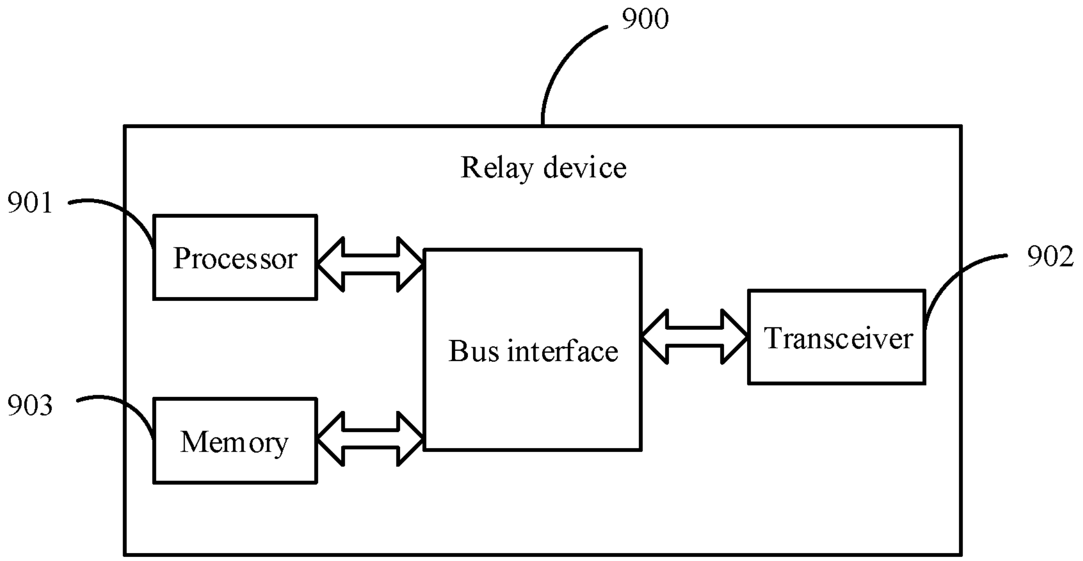
FIG. 9 is a schematic structural diagram of hardware of a relay device according to an embodiment of this application.

FIG. 9 is a structural diagram of a relay device according to an embodiment of this application. The relay device may be the first relay device in the method embodiments. As shown in FIG. 9, the relay device 900 includes a processor 901, a transceiver 902, a memory 903, and a bus interface, where the processor 901 is configured to:

switch between a first link state and a second link state based on a first guard period, where the first link state and the second link state are link states of an IAB node in different transmission modes.

Optionally, the first link state is a link state in a first transmission mode, and the first transmission mode satisfies:

mobile termination transmission MT TX and distributed unit transmission DU TX are aligned in time domain units or MT TX and DU TX work synchronously; and DU TX is aligned with TX timing of an IAB parent node in time domain units or DU TX is aligned with DU TX timing of the IAB parent node in time domain units, where the IAB parent node is a parent node of the IAB node.

Optionally, the second link state is a link state in a second transmission mode, and the second transmission mode satisfies:

DU TX is aligned with TX timing of an IAB parent node in time domain units or DU TX is aligned with DU TX timing of the IAB parent node in time domain units, where the IAB parent node is a parent node of the IAB node.

Optionally, different guard periods of the first guard period are for: switching between different first link states and the second link state and/or switching between the first link state and different second link states.

Optionally, the first guard period includes at least one of the following:

a guard period for switching from a first link state of MT TX and/or DU TX to a second link state of MT TX;

a guard period for switching from a first link state of MT TX and/or DU TX to a second link state of mobile termination reception MT RX;

a guard period for switching from a second link state of MT TX to a first link state of MT TX and/or DU TX;

a guard period for switching from a second link state of MT RX to a first link state of MT TX and/or DU TX;

a guard period for switching from a first link state of MT TX and/or DU TX to a second link state of DU TX;

a guard period for switching from a first link state of MT TX and/or DU TX to a second link state of distributed unit reception DU RX;

a guard period for switching from a second link state of DU TX to a first link state of MT TX and/or DU TX; and a guard period for switching from a second link state of DU RX to a first link state of MT TX and/or DU TX.

Optionally, the first guard period is defined by a protocol or configured by first signaling.

Optionally, the first signaling includes at least one of the following:

signaling with which the IAB node reports first information to a centralized unit CU or an IAB parent node; or signaling with which the CU or the IAB parent node configures first information for the IAB node, where the first information includes the first guard period or information associated with the first guard period.

Optionally, the first guard period is associated with a second guard period. The second guard period is a guard period for switching between the second link state and a third link state. The third link state and the second link state are link states under a same transmission mode.

Optionally, the first guard period being associated with the second guard period includes at least one of the following:

a guard period for switching from a first link state of MT TX and/or DU TX to a second link state of MT TX in the first guard period is equal to a guard period for switching from a second link state of DU TX to a third link state of MT TX in the second guard period;

a guard period for switching from a first link state of MT TX and/or DU TX to a second link state of MT RX in the first guard period is equal to a guard period for switching from a second link state of DU TX to a third link state of MT RX in the second guard period;

a guard period for switching from a second link state of MT RX to a first link state of MT TX and/or DU TX in the first guard period is equal to a guard period for switching from a second link state of MT RX to a third link state of DU TX in the second guard period;

a guard period for switching from a second link state of MT TX to a first link state of MT TX and/or DU TX in the first guard period is equal to a guard period for switching from a second link state of MT TX to a third link state of DU TX in the second guard period;

a guard period for switching from a first link state of MT TX and/or DU TX to a second link state of DU TX in the first guard period is equal to a guard period for switching from a second link state of MT TX to a third link state of DU TX in the second guard period;

a guard period for switching from a first link state of MT TX and/or DU TX to a second link state of DU RX in the first guard period is equal to a guard period for switching from a second link state of MT TX to a third link state of DU RX in the second guard period;

a guard period for switching from a second link state of DU RX to a first link state of MT TX and/or DU TX in the first guard period is equal to a guard period for switching from a second link state of DU RX to a third link state of MT TX in the second guard period; and a guard period for switching from a second link state of DU TX to a first link state of MT TX and/or DU TX in the first guard period is equal to a guard period for switching from a second link state of DU TX to a third link state of MT TX in the second guard period.

Optionally, an object to which the first guard period applies is defined by a protocol or configured by a network device, a CU, or an IAB parent node.

Optionally, the object to which the first guard period applies includes at least one of the following:

MT in the first link state;

MT in the second link state;

DU in the first link state; and

DU in the second link state.

Optionally, in a case that the first guard period is for switching between a first link state of MT TX and/or DU TX and a second link state of MT TX or MT RX, the first guard period applies to MT or DU in the first link state.

Optionally, the first guard period satisfies at least one of the following:

in a case that the first guard period is for switching between a first link state of MT TX and/or DU TX and a second link state of MT TX, the first guard period applies to MT in the second link state of MT TX;

in a case that the first guard period is for switching between a first link state of MT TX and/or DU TX and a second link state of MT RX, the first guard period applies to MT in the second link state of MT RX;

in a case that the first guard period is for switching between a first link state of MT TX and/or DU TX and a second link state of DU TX, the first guard period applies to MT and/or DU in the first link state of MT TX and/or DU TX; and in a case that the first guard period is for switching between a first link state of MT TX and/or DU TX and a second link state of DU RX, the first guard period applies to MT and/or DU in the first link state of MT TX and/or DU TX.

Optionally, the first guard period applies to a start time period or an end time period of a link state of the applied-to object.

Optionally, in a case that the first guard period is for switching from a first link state of MT TX and/or DU TX to a second link state of MT TX or MT RX, the first guard period applies to an end time period of the first link state of MT TX and/or DU TX; or in a case that the first guard period is for switching from a second link state of MT TX or MT RX to a first link state of MT TX and/or DU TX, the first guard period applies to a start time period of the first link state of MT TX and/or DU TX.

Optionally, in a case that the first relay device is the IAB node, the processor 901 is further configured to:

transmit second signaling to the IAB parent node or a CU, where the second signaling is used to indicate whether the IAB node supports a first transmission mode and a second transmission mode, or indicate configurations of the first transmission mode and the second transmission mode.

Optionally, in a case that the first relay device is an IAB node, the IAB node reports a DU RX offset and/or a time at which the DU RX occurs.

Optionally, the IAB parent node is configured with a first offset associated with the first guard period.

Optionally, the first signaling is configured with a first indication that is used to indicate whether data transmission is configured with the first guard period.

Optionally, the first indication is further used to indicate that the first guard period applies to a start time period or an end time period of data transmission.

Optionally, in a case that the first relay device is the IAB parent node or the CU, the processor 901 is further configured to:

transmit third signaling to a terminal, where the third signaling is used to configure a third guard period for MT TX and/or MT RX of the IAB node or uplink transmission and/or downlink transmission of the terminal.

Optionally, the third signaling is further used for at least one of the following:

configuring a time unit of the third guard period;

configuring a duration of the third guard period; and configuring a start time period and/or an end time period of MT TX and/or MT RX of the IAB node to which the third guard period applies.

Optionally, the third signaling includes at least one of the following:

higher layer or physical layer signaling, radio resource control RRC signaling, medium access control control element MAC CE signaling, downlink control information DCI signaling, backhaul application protocol control protocol data unit BAP control PDU, and physical downlink control channel PDCCH.

Optionally, the third guard period is a guard period for puncturing or rate matching of uplink transmission and/or downlink transmission of the terminal.

In FIG. 9, a bus architecture may include any quantity of interconnected buses and bridges, and specifically link together various circuits of one or more processors represented by the processor 901 and a memory represented by the memory 903. The bus architecture may further link together various other circuits such as a peripheral device, a voltage regulator, and a power management circuit, which are well known in the art and therefore are not further described herein. The bus interface provides an interface. The transceiver 902 may be a plurality of components, that is, the transceiver 902 includes a transmitter and a receiver, and provides a unit for communicating with various other apparatuses on a transmission medium. For different terminals, a user interface 904 may also be an interface that can be externally or internally connected to a required device. The connected device includes but is not limited to a keypad, a display, a speaker, a microphone, a joystick, and the like.

The processor 901 is responsible for bus architecture management and general processing. The memory 903 may store data used when the processor 901 performs an operation.

It should be noted that the relay device 900 in this embodiment may be a first relay device in any implementation of the method embodiments in the embodiments of this application. Any implementation of the first relay device in the method embodiments in the embodiments of this application can be implemented by the relay device 900 in this embodiment, with the same beneficial effect achieved. Details are not described herein again.

An embodiment of this application further provides a computer-readable storage medium, where a computer program is stored in the computer-readable storage medium. When the computer program is executed by a processor, the processes of the foregoing embodiment corresponding to the first relay device can be implemented, with the same technical effects achieved. To avoid repetition, details are not described herein again. The computer-readable storage medium is, for example, a read-only memory (ROM), a random access memory (RAM), a magnetic disk, or an optical disc.

An embodiment of this application further provides a chip. The chip includes a processor and a communications interface, where the communications interface and the processor are coupled, the processor is configured to run programs or instructions to implement the processes of the foregoing embodiments of the link state switching method, with the same beneficial effect achieved. To avoid repetition, details are not described herein again.

It should be understood that the chip provided in this embodiment of this application may also be referred to as a system-level chip, a system on chip, a chip system, a system-on-a-chip, or the like.

It may be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), DSP Device (DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application is subject to the protection scope of the claims.

What is claimed is:

1. A link state switching method, executed by a first relay device, comprising:

switching between a first link state and a second link state based on a first guard period, wherein:

the first link state and the second link state are link states of an integrated access backhaul (IAB) node in different transmission modes;

the first link state is a link state in a first transmission mode, and the first transmission mode satisfies: mobile termination transmission (MT TX) and distributed unit transmission (DU TX) are aligned in time domain units or MT TX and DU TX work synchronously;

the second link state is a link state in a second transmission mode, and the second transmission mode satisfies: DU TX is aligned with DU TX timing of an IAB parent node in time domain units, wherein the IAB parent node is a parent node of the IAB node; and the first guard period comprises at least one of the following: a guard period for switching from a first link state of MT TX and DU TX to a second link state of MT TX; or a guard period for switching from a first link state of MT TX and DU TX to a second link state of mobile termination reception (MT RX), wherein the first guard period is configured by first signaling; and wherein the first signaling comprises signaling with which the IAB parent node configures first information for the IAB node, the first information comprising the first guard period.

2. The method according to claim 1, wherein different guard periods of the first guard period are for: switching between different first link states and the second link state, and/or switching between the first link state and different second link states.

3. The method according to claim 2, wherein the first guard period further comprises at least one of the following:

a guard period for switching from a first link state of MT TX or DU TX to the second link state of MT TX;

a guard period for switching from a first link state of MT TX or DU TX to the second link state of mobile termination reception (MT RX);

a guard period for switching from a second link state of MT TX to a first link state of MT TX and/or DU TX;

a guard period for switching from a second link state of MT RX to a first link state of MT TX and/or DU TX;

a guard period for switching from a first link state of MT TX and/or DU TX to a second link state of DU TX;

a guard period for switching from a first link state of MT TX and/or DU TX to a second link state of distributed unit reception (DU RX);

a guard period for switching from a second link state of DU TX to a first link state of MT TX and/or DU TX; or a guard period for switching from a second link state of DU RX to a first link state of MT TX and/or DU TX.

4. The method according to claim 1, wherein the first signaling comprises Medium Access Control Control Element (MAC CE) signaling.

5. The method according to claim 1, wherein the first guard period is associated with a second guard period, the second guard period is a guard period set for switching between the second link state and a third link state, and the third link state and the second link state are link states under a same transmission mode.

6. The method according to claim 1, wherein:

an object to which the first guard period applies is defined by a protocol or configured by a network device, a centralized unit (CU), or the IAB parent node;

the object to which the first guard period applies comprises at least one of the following: MT in the first link state; MT in the second link state; DU in the first link state; and DU in the second link state; and in a case that the first guard period is for switching between a first link state of MT TX and/or DU TX and a second link state of MT TX or MT RX, the first guard period applies to MT or DU in the first link state.

7. The method according to claim 1, wherein in a case that the first relay device is an IAB node, the IAB node reports a DU RX offset and/or a time at which a DU RX offset occurs.

8. The method according to claim 1, wherein the first signaling is configured with a first indication that is used to indicate whether data transmission is configured with the first guard period.

9. A relay device, comprising:

a memory, at least one hardware processor, and a computer program stored in the memory and capable of running on the at least one hardware processor that, when executed, direct the relay device to:

switch between a first link state and a second link state based on a first guard period, wherein:

the first link state and the second link state are link states of an integrated access backhaul (IAB) node in different transmission modes;

the first link state is a link state in a first transmission mode, and the first transmission mode satisfies: mobile termination transmission (MT TX) and distributed unit transmission (DU TX) are aligned in time domain units or MT TX and DU TX work synchronously;

the second link state is a link state in a second transmission mode, and the second transmission mode satisfies: DU TX is aligned with DU TX timing of an IAB parent node in time domain units, wherein the IAB parent node is a parent node of the IAB node; and the first guard period comprises at least one of the following: a guard period for switching from a first link state of MT TX and DU TX to a second link state of MT TX; or a guard period for switching from a first link state of MT TX and DU TX to a second link state of mobile termination reception (MT RX), wherein the first guard period is configured by first signaling; and wherein the first signaling comprises signaling with which the IAB parent node configures first information for the IAB node, the first information comprising the first guard period.

10. A non-transitory computer-readable storage medium having program instructions stored thereon executable by at least one hardware processor that, when executed by the at least one hardware processor, direct that at least one hardware processor to:

switch between a first link state and a second link state based on a first guard period, wherein:

the first link state and the second link state are link states of an integrated access backhaul (IAB) node in different transmission modes;

the first link state is a link state in a first transmission mode, and the first transmission mode satisfies: mobile termination transmission (MT TX) and distributed unit transmission (DU TX) are aligned in time domain units or MT TX and DU TX work synchronously;

the second link state is a link state in a second transmission mode, and the second transmission mode satisfies: DU TX is aligned with DU TX timing of an IAB parent node in time domain units, wherein the IAB parent node is a parent node of the IAB node; and the first guard period comprises at least one of the following: a guard period for switching from a first link state of MT TX and DU TX to a second link state of MT TX; or a guard period for switching from a first link state of MT TX and DU TX to a second link state of mobile termination reception (MT RX), wherein the first guard period is configured by first signaling; and wherein the first signaling comprises signaling with which the IAB parent node configures first information for the IAB node, the first information comprising the first guard period.

11. The relay device according to claim 9, wherein different guard periods of the first guard period are for: switching between different first link states and the second link state, and/or switching between the first link state and different second link states.

12. The relay device according to claim 11, wherein the first guard period further comprises at least one of the following:

a guard period for switching from a first link state of MT TX or DU TX to the second link state of MT TX;

a guard period for switching from a first link state of MT TX or DU TX to the second link state of mobile termination reception (MT RX);

a guard period for switching from a second link state of MT TX to a first link state of MT TX and/or DU TX;

a guard period for switching from a second link state of MT RX to a first link state of MT TX and/or DU TX;

a guard period for switching from a first link state of MT TX and/or DU TX to a second link state of DU TX;

a guard period for switching from a first link state of MT TX and/or DU TX to a second link state of distributed unit reception (DU RX);

a guard period for switching from a second link state of DU TX to a first link state of MT TX and/or DU TX; or a guard period for switching from a second link state of DU RX to a first link state of MT TX and/or DU TX.

13. The relay device according to claim 9, wherein the first signaling comprises Medium Access Control Control Element (MAC CE) signaling.

14. The non-transitory computer-readable storage medium according to claim 10, wherein different guard periods of the first guard period are for: switching between different first link states and the second link state, and/or switching between the first link state and different second link states.

15. The non-transitory computer-readable storage medium according to claim 14, wherein the first guard period further comprises at least one of the following:

a guard period for switching from a first link state of MT TX or DU TX to the second link state of MT TX;

a guard period for switching from a first link state of MT TX or DU TX to the second link state of mobile termination reception (MT RX);

a guard period for switching from a second link state of MT TX to a first link state of MT TX and/or DU TX;

a guard period for switching from a second link state of MT RX to a first link state of MT TX and/or DU TX;

a guard period for switching from a first link state of MT TX and/or DU TX to a second link state of DU TX;

a guard period for switching from a first link state of MT TX and/or DU TX to a second link state of distributed unit reception (DU RX);

a guard period for switching from a second link state of DU TX to a first link state of MT TX and/or DU TX; or a guard period for switching from a second link state of DU RX to a first link state of MT TX and/or DU TX.

* * * * *